US008709571B2

(12) United States Patent
Bruder et al.

(10) Patent No.: US 8,709,571 B2
(45) Date of Patent: *Apr. 29, 2014

(54) DISC SHAPED HIGH DENSITY RECORDING MEDIUM (75) Inventors: Friedrich-Karl Bruder, Krefeld (DE); Wilfried Haese, Odenthal (DE); Rafael Oser, Krefeld (DE); Rainer Protte, Dormagen (DE); Alexander Meyer, Düsseldorf (DE); Karlheinz Hildenbrand, Krefeld (DE); Raymond Wong, Hong Kong (CN); Ice Zhang, Shanghai (CN)

(73) Assignee: Bayer MaterialScience AG, Leverkusen (DE)

( * ) Notice: Subject to any disclaimer, the term of this patent is extended or adjusted under 35 U.S.C. 154(b) by 294 days.

This patent is subject to a terminal disclaimer.

(21) Appl. No.: 13/142,106

(22) PCT Filed: Dec. 12, 2009

(86) PCT No.: PCT/EP2009/008902
§ 371 (c)(1),
(2), (4) Date: Aug. 26, 2011

(87) PCT Pub. No.: WO2010/072343
PCT Pub. Date: Jul. 1, 2010

(65) Prior Publication Data
US 2011/0300325 A1 Dec. 8, 2011

(30) Foreign Application Priority Data
Dec. 25, 2008 (WO) ............... PCT/CN2008/002082

(51) Int. Cl.
G11B 7/24 (2013.01)

(52) U.S. Cl.
USPC .................... 428/64.1; 428/64.4; 430/270.11

(58) Field of Classification Search
USPC .................... 428/64.4; 430/270.11
See application file for complete search history.

(56) References Cited

U.S. PATENT DOCUMENTS

| 6,391,418 | B1 | 5/2002 | Ueda et al. |
| 6,875,489 | B2 | 4/2005 | Koya et al. |
| 6,908,655 | B2 | 6/2005 | Arakawa et al. |
| 2003/0026936 | A1 | 2/2003 | Kido et al. |
| 2004/0265605 | A1 | 12/2004 | Hermann et al. |
| 2008/0081181 | A1 | 4/2008 | Hildenbrand et al. |

FOREIGN PATENT DOCUMENTS

| DE | 102006046160 A1 | 4/2008 |
| EP | 0317262 A2 | 5/1989 |
| EP | 0532337 A2 | 3/1993 |
| EP | 1158024 A1 | 11/2001 |

(Continued)

OTHER PUBLICATIONS

U.S. Appl. No. 13/142,097, filed Jun. 24, 2011, Bruder et al.

Primary Examiner — Elizabeth Mulvaney
(74) Attorney, Agent, or Firm — Novak Druce Connolly Bove + Quigg LLP (57) ABSTRACT This invention relates to an optical recording medium in which at least a recording layer and a light transmitting layer are sequentially formed on a substrate and in which the light is illuminated from the light transmitting layer side for recording and/or reproducing information signals, said substrate comprising an injection molded part, and said substrate having a Young's modulus E of at least 2.15 GPa and a Q factor of lower than 160 measured at 25° C. at 2000 Hz in accordance to ASTM E 756-05 05 and a transcriptability of the pit/groove structure of >85%.

15 Claims, 1 Drawing Sheet

Setup of the Laser-Doppler-Vibrometer Method

(56) References Cited

FOREIGN PATENT DOCUMENTS

| | | |
|---|---|---|
| EP | 1518880 A1 | 3/2005 |
| JP | 60026024 A | 2/1985 |
| JP | 61292601 A | 12/1986 |
| JP | 62019801 A | 1/1987 |
| JP | 62019802 A | 1/1987 |
| JP | 7-114030 A | 5/1995 |
| WO | WO-00/48172 A2 | 8/2000 |
| WO | WO-01/48031 A1 | 7/2001 |
| WO | WO-03/005354 A1 | 1/2003 |

Setup of the Laser-Doppler-Vibrometer Method

DISC SHAPED HIGH DENSITY RECORDING MEDIUM

CROSS-REFERENCE TO RELATED APPLICATIONS

This application is a national stage application (under 35 U.S.C. §371) of PCT/EP2009/008902, filed Dec. 12, 2009, which claims benefit of PCT application PCT/CN2008/002082, filed Dec. 25, 2008.

1. FIELD OF INVENTION

This invention relates to a disc-shaped high density recording medium with a special structure for recording a variety of information signals, like digital data adapted to Near Field Optical Pick up Heads.

2. DESCRIPTION OF RELATED ART

Among the recording mediums for recording and reproducing information signals, such as that for audio or video, there are known disc-shaped optical recording medium and a disc-shaped magnetic recording medium.

Among these recording mediums, there are optical discs, on which information signals are written as micro-irregularities, such as by pits and grooves, a phase-change optical disc, a magneto-optical disc, exploiting photo magnetic effects of the recording film, and a hard disc for magnetically written signals.

For forming a recording layer on an optical recording medium, among these recording mediums, having micro-irregularities, such as phase pits or pre-grooves, in association with information signals, such as data information or tracking servo signals, injection molding of a substrate of plastics material is routinely employed. Specifically, a disc-shaped substrate is formed using an injection molding device, a metal mold and a stamper, and information signals are transcribed at this time from the stamper.

To readout and record information to such optical discs usually a laser beam with wavelength λ is focused through a simple objective lens of given numerical aperture NA onto the recording layer through a light transmitting layer of thickness d>>λ and at a working distance WD>>λ between the objective lens and the surface of the light transmitting layer. The spot diameter D of the focused laser beam is given hereby as D=λ/NA. Commercially available discs like Compact Discs (CD, λ=780 nm, NA=0.45, d=1.2 mm), Digital Versatile Discs (DVD, λ=650 nm, NA=0.60, d=0.6 mm), High Definition Digital Versatile Discs (HD-DVD, λ=405 nm, NA=0.65, d=0.6 mm) or Blu-ray Discs (BD, λ=405 nm, NA=0.85, d=0.1 mm) are using this Far Field Optic principle. By reducing λ and increasing NA the spot diameter D can be reduced and therefore the data density can be increased.

However in such Far Field Optics (d and WD>>λ) the NA of the objective lens is limited to values <1.0. To further increase the data density NA has to become larger than 1.0 which can be realized by Near Field Optics (NFR). One implementation of NFR can be by utilizing a so called Solid Immersion Lens (SIL) (S. M. Mansfield, W. R. Studenmund, G. S. Kino, and K. Osato, "High-numerical-aperture lens system for an optical storage head," Opt. Lett. 18, 305 ff (1993)). E.g. in a lens system composed of a Far Field lens of NA<1.0 and a hemispherical lens made of a material with index of refraction $n_{SIL}$, the effective numerical aperture $NA_{eff}$ is given by $NA \cdot n_{SIL}$ which will exceed 1.0 if $n_{SIL}$ is large enough. Another implementation could be by a small aperture of diameter $D_{Ap}$<<, λ which can be realized either by fiber optics with a very narrow end aperture (H. Brückl, Physik in unserer Zeit, 28, Jahrgang 1997 Nr. 2, p 67 ff) or by an optically non linear responding thin masking layer (so called Super Resolution Enhanced Near Field Structure see: J. Tominaga, et al., Advanced Physics Letters, Vol 73 (15) 1998).

NFR utilizes the electromagnetic field at a WD<<λ between the surface of the lens system or aperture and the surface of the disk or the recording layer. E.g. in K. Saito et al., Technical Digest ISOM 2001, p 244 ff, it was shown that at a working distance WD<<405 nm sufficient light of the evanescent wave of a SIL can be coupled into the disc, so that $NA_{eff}$ of that SIL can be increased above the Far Field limit of 1.0. Also it was shown that the accuracy of WD has to be controlled to a level of a few nm in order to get a stable reproducing signal. This can be understood as the intensity of the evanescent wave decays exponentially with the distance from the lens surface. To establish such a control mechanism an active feed back servo loop was proposed and introduced by T. Ishimoto et al., Technical Digest ISOM/ODS 2002, WC3, p 287 ff. This servo loop is able to compensate also fluctuations of WD coming from modal oscillations of the rotating disc (J. I. Lee et al., Technical Digest ODS 2006 MC4, p 43 ff). However due to band width limitations of the servo loop such compensation works only well at lower disk rotation speeds and for low frequency modal oscillations. Therefore a limitation in data transfer rates exists due to the amplitudes of the high frequency modal oscillations of an e.g. 1.1 mm thick massive polycarbonate disc with 120 mm diameter. The substrate disclosed therein does not fulfill the requirements of the substrate of the present invention. In order to improve the gap servo control operation also at high disc rotation speed especially the high frequency modal oscillation behavior of the disc has to be improved.

The modal oscillation is characterized by its modal frequency $f_n$ which is related to the geometry of the disc and the ration of Youngs modulus E and mass density ρ according to $f_n$ proportional to $(E/\rho)^{0.5}$ (see also equation 1). The quality factor Q (see equation 2) is related to tan δ via Q=3/tan δ. In that sense Q can be used as a measure of the damping like tan δ. Low Q means high damping as tan δ is high. In general E and Q show a distinct dependency on frequency f.

U.S. Pat. No. 6,908,655 B2 focuses on influencing the low frequency (first) modal oscillations that occur on a typical 1.1 mm thick massive polycarbonate disc of 120 mm diameter around 140 Hz and is also related to a far field optical pick up head. U.S. Pat. No. 6,908,655 B2 discloses that with standard 1 K injection molding not all key parameters like stiffness, damping, planarity and especially the transcriptability of the pit/groove structure of the optical disc can be balanced or optimized at the same time. Therefore a complicated sandwich structure is proposed with a skin layer of a state of the art optical disc grade polycarbonate.

It is therefore desirable to generate an optical disc comprised of a simple 1 K injection molded substrate with either an increased stiffness or an increased damping or both and showing a high transcriptability of the pit/groove structure.

WO 00/48172 is focussed on the first modal frequency (<300 Hz) behaviour of a disc and it is said that the first modal frequency should be preferably located outside the rotation operating range of the disc. With respect to the behavior of the high frequency modal oscillations (>=2000 Hz) no solution is disclosed. Comparative example 3 which is presented in the experimental part of the present application, based on example 2 of WO 00/48172, shows that solutions that fulfill the low frequency requirements with respect to damping do not meet the high frequency requirements of the present invention.

WO 2003/005354A1 describes special copolycarbonates to achieve improved damping of the discs. This embodiment is different to the present invention with respect to either the chemical structure of the polymer or describes the low (first) modal frequency requirements with respect to damping but does not describe the high frequency requirements of the present invention.

Further solutions to achieve improved damping at low frequencies (1 Hz-16 Hz), which however are not sufficient for the high frequency modal oscillation requirements of the present invention were published in U.S. Pat. No. 6,391,418 B1, EP 1 158 024 A1 and US 2004/0265605 A1. U.S. Pat. No. 6,391,418 B1 describes a substrate for information recording media made of a polycarbonate composition comprising polycarbonate of a viscosity-average molecular weight of 10.000 to 40.000 and on biphenyl, a terphenyl compound or a mixture thereof. EP 1 158 024 A1 describes a vibration-damping thermoplastic resin composition comprising a) 50-90 wt. % of an amorphous thermoplastic resin having a loss tan $\delta$ of 0.01 to 0.04 and a deflection temperature under load of not lower than 120° C. and b) 50 to 10 wt. % of a methyl methacrylate resin wherein the article molded therefrom has certain physical properties. US 2004/0265605 A1 describes a vibration damping storage medium for data comprising a substrate, a physical portion of which comprises at least one polyimide and at least one data layer on the substrate. It is related to the first modal (low frequency) oscillation. Another important feature for NFR is, the ability to couple light from the evanescent field through the WD<<$\lambda$ into the surface of the recording medium to fully utilize the $NA_{eff}$ of the SIL for reducing D to $\lambda/NA_{eff}$. For that the real part n of the index of refraction of the uppermost light transmitting layer of the recording medium has to be larger than $NA_{eff}$. Such a layer can be realized by a high refractive index layer (HRI coating) which according to the invention may form the uppermost layer of recording medium and allows the coupling of light in the evanescent field into the recording medium. The HRI coating may also be used as a spacer layer between two or more reproducing layers or recording layers. To increase the storage density at least by a factor of 2, in comparison to the best respective Far Field optic (NA<1.0) $NA_{eff}$ should be at least >1.41 and therefore the real part n of the index of refraction of the HRI layer should be at least >1.41. Prior art focused on Far Field optics did not have to account for that.

U.S. Pat. No. 6,875,489 B2 or EP 1,518,880 A1 are focusing on light transmitting layers with thicknesses d>3 μm, as these embodiments are related to Far Field optical discs like BD. As with NFR the effective $NA_{eff}$ is larger than 1.0, it is crucial to restrict the light transmitting layer thickness d to smaller values (e.g. <=3 μm) as it is easier to compensate for e.g. aberrations (Zijp et al., Proc. of SPIE Vol. 5380, p 209 ff.

In addition to the above mentioned optical properties of the HRI layer and due to the very small WD of NFR Optical Pick Up Heads, such HRI layer also should act as protection layer for the information stored in the recording medium and for the Optical Pick Up Head in case of an accidental head crash. Therefor the HRI layer should have a high scratch resistance and a low surface roughness $R_a$, as WD is in the range of only a few 10 nm. Also the absorption or imaginary part k of the index of refraction of the HRI layer should be low, in order to enable high enough reflection from multiple stacked recording layers, separated by spacer layers that may be comprised of the HRI layer and to realize high readout stability. Again prior art did not have to account for such a complex property profile of the disc structure.

Therefore the object of the present invention was to provide an optical recording medium for a gap servo controlled NFR disc in which at least a recording layer and a light transmitting layer are sequentially formed on a substrate and in which the light is illuminated from the light transmitting layer side for recording and/or reproducing information signals and said substrate fulfills specific requirements with respect to the Youngs modulus and the damping (Q-factor) at the high frequency of 2000 Hz. A further object of the present invention was to provide an optical recording medium as described above that comprises at least a recording layer and a light transmitting layer with specific requirements with respect to index of refraction, scratch resistance and surface roughness. The recording layer and the light transmitting layer are sequentially formed on a substrate and in which the light is illuminated from the light transmitting layer side for recording and/or reproducing information signals, wherein said substrate may be comprised of an injection molded part and said substrate having a Young's modulus E of at least 2.15 GPa and a Q factor of lower than 160 measured at 25° C. at 2000 Hz in accordance to ASTM E 756-05 and a transcriptability of the pit/groove structure of >85%.

3. SUMMARY OF THE INVENTION

In gap servo controlled Near Field Recording and Near Field Readout the working distance WD between the lens and the disk surface has to be reduced far below the wavelength $\lambda$ of the laser light and has to be controlled within thight limits. Therefore severe requirements with regard the high frequency modal oscillation behavior of the disc and with regard to the thickness, the optical and mechanical properties of the light transmitting layer exist. The present invention shows a special selection of disc architectures, realized with suitable materials to solve the aforementioned problems.

Therefore the present invention is directed to an optical recording medium in which at least a recording layer and a light transmitting layer are sequentially formed on a substrate and in which the light is illuminated from the light transmitting layer side for recording and/or reproducing information signals, said substrate comprising an injection molded part and said substrate having a Young's modulus E of at least 2.15 GPa and a Q factor of lower than 160 measured at 25° C. at 2000 Hz in accordance to ASTM E 756-05 and a transcriptability>85%.

Preferably the invention is an optical recording medium according to claim 1 characterized in that the substrate is molded at a mold temperature>Tg (glass transition temperature)−30° C., preferably at a mold temperature>Tg (glass transition temperature)−20° C.

The present invention is also a method of preparing the substrate as basis for an optical recording medium according to claim 1 wherein the substrate is molded at a mold temperature>Tg (glass transition temperature)−30° C. against a stamper including pits and/or grooves by which method said pits and/or grooves are replicated into the substrate with a transcriptability>85%.

4. DESCRIPTION OF THE PREFERRED EMBODIMENTS

Ways to influence the modal oscillations of the disc at high frequencies is to increase its Youngs modulus E (stiffness) which shifts the modal oscillation to higher frequency, thereby reducing it's amplitude at a given damping, or to decrease its quality factor Q (increase it's damping) to decrease the oscillation amplitude. To overcome the problem it is possible to either improve the stiffness or the damping as a single parameter, or to improve both at a time.

The thickness of the light transmitting layer is preferably from 1 nm to less than 3000 nm, more preferably from 200 nm to less than 2000 nm and especially from 500 nm to less than 1500 nm.

5. DESCRIPTION OF THE SUBSTRATE MATERIAL

Examples for adequate substrate materials for forming the substrate are polymers, blends and compounds (filled thermoplastic resin compositions), as long as the substrate satisfies the requirements of the Youngs's modulus E and the Q factor. However, the polymer resins of the present invention for said substrate are not limited to the following examples.

In addition to the requirements regards Youngs's modulus E and the Q factor the thermoplastic resin, blend or compound should have a low water absorption, a high heat resistance and should be processable to disks with the common methods like injection molding, injection compression molding and the like.

In addition to the requirements regards Youngs modulus E and the Q factor the thermoplastic resin, blend or compound should have low water absorption, a high heat resistance and should be processable to disks with the common methods like injection molding, injection compression molding and the like.

Such thermoplastic resins can be selected from polycarbonate resins, acrylic resins, polystyrene resin and amorphous polycyclic olefins as well as hydrogenated polystyrene. The thermoplastic resin also can be a blend consisting of different thermoplastic resins as well as be a compound of thermoplastic resin(s) with fillers and/or additives.

Polycarbonate Resins

The polycarbonate resins are generally obtained by solution polymerizing or melt polymerizing of an aromatic dihydroxy compound and a carbonate precursor. Any aromatic dihydroxy compound is acceptable if it satisfies the above conditions.

Preferred aromatic dihydroxy compounds are compounds of formula (1)

$$HO—Z—OH \quad (1)$$

in which Z denotes a radical of the formula (1a)

in which
$R^1$ and $R^2$ independently of each other represent H or $C_1$-$C_8$-alkyl, preferably H or $C_1$ $C_4$-alkyl, in particular hydrogen or methyl and X represents a single bond, $C_1$-$C_6$-alkylene, $C_2$-$C_5$-alkylidene or $C_5$-$C_6$-cycloalkylidene, which may be substituted by $C_1$-$C_6$-alkyl, preferably methyl or ethyl, with the proviso that. $R^1$ and $R^2$ represent hydrogen if X represents 3,3,5 trimethylcyclohexylidene.

Most preferably X represents a single bond, methylene, isopropylidene or cyclo-hexylidene or 3,3,5 trimethylcyclohexylidene, in particular X represents isopropylidene or 3,3,5 trimethylcyclohexylidene.

Aromatic dihydroxy compounds are generally known or can be prepared according to generally known methods.

Examples of the aromatic dihydroxy compound include hydroquinone, resorcinol, 4,4'-biphenol, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)-1-phenylethane, 1,1-bis(4-hydroxyphenyl)cyclohexane, 2,2-bis(4-hydroxyphenyl)pentane, 4,4'-(p-phenylene diisopropylidene)diphenol, 9,9-bis(4-hydroxyphenyl)fluorene, 1,1-bis(4-hydroxyphenyl)-4-isopropyl cyclohexane, 2,2-bis(3-methyl-4-hydroxyphenyl)propane, 1,1-bis(4-hydroxyphenyl)cyclohexane, 1,1-bis(4-hydroxyphenyl)-3,3,5-trimethylcyclohexane, 9,9-bis(3-methyl-4-hydroxyphenyl)fluorene and α,α'-bis(4-hydroxyphenyl)m-diisopropylbenzene. Preferred dihydroxy compounds are 2,2-bis(4-hydroxyphenyl)propane (bisphenol A), 4,4'-(m-phenylene diisopropylidene)diphenol and 1,1-bis(4-hydroxyphenyl)-3,3,5-trimethylcyclohexane.

The polycarbonate resin may be a homopolycarbonate obtained by homopolymerizing the above aromatic dihydroxy compound or a copolycarbonate obtained by copolymerizing two or more aromatic dihydroxy compounds. Further, it may be a copolycarbonate obtained by polymerizing the above aromatic dihydroxy compound with one or more other dihydroxy compounds.

The reaction by a solution method is usually a reaction between a dihydric phenole and phosgene, and is usually carried out in the presence of an acid coupling agent and an organic solvent. As the acid coupling agent, alkali metal hydroxides, such as sodium hydroxide or potassium hydroxide, or amine compounds, such as pyridine, are used. As the organic solvent, halogenated hydrocarbons, such as methylene chloride or chlorobenzene, are used. For accelerating the reaction, a catalyst such as tertiary amines, quaternary ammonium compounds or quaternary phosphonium compounds which are exemplified by triethylamine, N-ethyl-piperidine, tetra-n-butylammonium bromide, or tetra-n-butylphosphonium bromide respectively may also be used. Preferably, the reaction temperature is routinely 0 to 40° C., with a reaction time being 10 minutes to 5 hours and with a pH during the reaction being not less than 9.

In the polymerization reaction, terminal capping agents are usually employed. These terminal capping agents used may be monofunctional phenols. These monofunctional phenols are routinely used as the terminal capping agents for adjusting the molecular weight. The polycarbonate resin obtained has its terminal capped by a monofunctional phenol based group so that it is superior in thermal stability to polycarbonate resin not obtained as described above. The monofunctional phenols are generally phenols or lower alkyl substituted phenols like phenol, p-tert-butylphenol, p-cumylphenol, isooctylphenol or long-chain alkyl phenols like decyl phenol, dodecyl phenol, hexadecyl phenol, octadecyl phenol, eicosyl phenol, docosyl phenol and triacontyl phenol.

The terminal capping agent is introduced in an amount to achieve the appropriate molecular weight. The terminal capping agent may be used alone or in combination.

The average molecular weight of the polycarbonate or the copolycarbonates is characterized by the relative solution viscosity of a polymer solution in dichloromethane with an Ubbelhode capillary viscometer, capillary type 0C. The polymer concentration is 5 g/l, the measurement is done at a temperature of 25° C. The relative solution viscosity is in the range of 1.15 to 1.30, preferably in the range of 1.18 to 1.25, especially preferably in the range of 1.19 to 1.23.

The reaction by the melting method is usually an ester exchange reaction between a dihydric phenol and a carbonate ester, and is carried out by a method consisting in mixing the dihydric phenol and the carbonate ester in the presence of an inert gas under heating and in distilling off the generated alcohol or phenol. Although the reaction temperature differs with e.g., the boiling point of the generated alcohol or phenol, it is usually 120 to 350° C. During the latter half of the reaction, the reaction system is reduced in pressure to approximately $1.33 \times 10^3$ to 13.3 Pa to facilitate distillation of the generated alcohol or phenol. The reaction time is usually 1 to 4 hours.

Among the carbonate esters, there are esters, such as C6 to C10 aryl groups or aralkyl groups or C1-4 alkyl groups, that may occasionally be substituted, specifically, diphenyl carbonate, bis(chlorophenyl)carbonate, dinaphthyl carbonate, bis(diphenyl)carbonate, dimethyl carbonate, diethyl carbonate and dibutyl carbonate. Of these, diphenyl carbonate is most preferred.

For accelerating the polymerization, polymerization catalysts may also be used. As these polymerization catalysts, those catalysts routinely used for esterification or ester exchange reactions, such as alkali metal compounds, e.g., sodium hydroxide, potassium hydroxide, or sodium or potassium salts of dihydric phenols, alkali earth metal compounds, such as calcium hydroxide, barium hydroxide or magnesium hydroxide, nitrogen-containing basic compounds, such as tetramethyl ammonium hydroxide, tetraethyl ammonium hydroxide, trimethylamine or triethylamine, alkoxides of alkali metals or alkali earth metals, phosphorous-containing basic compounds like tetraphenyl-phosphoniumphenolat or organic acid salts of alkali metals or alkali earth metals, zinc compounds, boron compounds, aluminum compounds, silicon compounds, germanium compounds, organotin compounds, lead compounds, osmium compounds, antimony compounds, manganese compounds, titanium compounds or zirconium compounds, may be used. These catalysts may be used alone or in combination. These catalysts are used in an amount preferably of $1 \times 10^{-8}$ to $1 \times 10^{-3}$ equivalent, more preferably $1 \times 10^{-7}$ to $5 \times 10^{-4}$ equivalent, to one mol of the dihydric phenol as the starting material.

The aromatic polycarbonate resins may contain tri- or higher functional aromatic compounds or contain branched components in the polymer as a result of the isomerization reaction in polymerization. Examples of the tri- or higher functional aromatic compounds preferably include phlorogrucin, phlorogrucide, tris phenols, such as 4,6-dimethyl-2,4,6-tris(4-hydroxyphenyl)heptene-2,2,4,6-trimethyl-2,4,6-tris(4-hydroxyphenyl)heptane, 1,3,5-tris(4-hydroxyphenyl) benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methyl phenol, and 4-(4-[1,1-bis(4-hydroxyphenyl)ethyl]benzene)-α,α-dimethylnbenzyl phenol, tetra(4-hydroxyphenyl)methane, bis(2,4-dihydroxyphenyl)ketone, 1,4-bis(4,4-dihydroxytriphenyl methyl)benzene, trimellitic acid, pyromellitic acid, benzophenone tetracarboxylic acid and acid chlorites thereof. Of these, 1,1,1-tris (4-hydroxyphenyl)ethane and 1,1,1-tris(3,5-dimethyl-4-hydroxyphenyl)ethane, are preferred.

Phosphorus-based thermal stabilizers, may be added to the thermoplastic resin. Suitable phosphorus-based thermal stabilizers are for example, phosphorous acid, phosphoric acid, phosphonous acid, phosphonic acid and esters thereof. Specifically, phosphite compounds, such as triphenyl phosphite, tris nonylphenyl phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite and bis(2,4-di-tert-butylphenyl) pentaerythritol diphosphite, and phosphate compounds, such as tributyl phosphate, trimethyl phosphate, tricresyl phosphate, triphenyl phosphate, trichlorophenyl phosphate, triethyl phosphate, diphenyl cresyl phosphate, diphenyl monoorthoxenyl phosphate, tributoxy ethyl phosphate, dibutyl phosphate and diisopropyl phosphate, may be indicated. Additional phosphorus-based thermal stabilizers are for example tetrakis(2,4-di-tert-butylphenyl)-4,4'-biphenylene diphosphonite, tetrakis(2,4-di-tert-butylphenyl)-3,3'-biphenylene diphosphonite and bis(2,4-di-tert-butylphenyl)-4-biphenylene phosphonite. Of these, tris nonylphenylphosphonite, distearyl pentaerythritol diphosphite, bis(2,4-di-tertbutylphenyl)pentaerythritol disphosphite, tris(2,4-di-tertbutylphenyl)phosphite, triphenyl phosphate, trimethyl phosphate, tetrakis(2,4-di-tert-butylphenyl)-4,4'-biphenylene diphosphonite and bis(2,4-di-tert-butylphenyl)-4-biphenylene phosphonite, are preferred. These thermal stabilizers may be used alone or as a mixture. The amount of these thermal stabilizers is preferably 0.0001 to 0.5 weight part, more preferably 0.0005 to 0.2 weight part and most preferably 0.002 to 0.2 weight part to 100 weight parts of the thermoplastic resin composition.

A generally known antioxidant may be added to the thermoplastic resin of the present invention to prevent oxidation. An example of the antioxidant is a phenol-based antioxidant. The amount of the antioxidant is preferably 0.0001 to 0.05 wt % based on the thermoplastic resin.

A higher fatty acid ester of a monohydric alcohol or polyhydric alcohol may be optionally added to the thermoplastic resin of the present invention. By blending a higher fatty acid ester of a monohydric or polyhydric alcohol, releasability from a mold at the time of molding the thermoplastic resin is improved, and a release load in the molding of a disk substrate becomes small, thereby making it possible to prevent the deformation of the disk substrate and pit dislocation caused by a release failure. The melt fluidity of the thermoplastic resin is also improved.

The amount of the ester of an alcohol and a higher fatty acid is 0.01 to 2 wt %, preferably 0.015 to 0.5 wt %, more preferably 0.02 to 0.2 wt % based on the thermoplastic resin.

Additives such as other thermoplastic resin, optical stabilizer, colorant, antistatic agent and lubricant may be added to the resin for an optical disk substrate of the present invention in limits that transcribility and the effect of reducing warp in the moisture absorption and moisture desorption steps of the molded disk are not impaired.

In the preparation of the resin composition of the present invention, it is conceivable that mixing of polycarbonate resins and/or mixing of a polycarbonate resin and other resin is carried out in the stage of a polymer solution or a molded article such as a particle or pellet. It is not particularly limited. As for means of mixing, in the stage of a polymer solution, a vessel equipped with a stirrer is mainly used, and in the stage of a molded product such as a particle or pellet, a tumbler, twin-cylinder mixer, Nauter mixer, Banbury mixer, kneading roll or extruder may be used. In either case, any technique may be used and not particularly limited.

In the above-mentioned resin composition, a variety of fillers can be added as additional component for improving stiffness and oscillation damping characteristics. The fillers may be enumerated by glass fibers, glass flakes, carbon fibers, milled fibers, wollastonite whiskers, carbon black, carbon nanotubes, silica particles, titanium oxide particles, alumina particles, talcum, mica and other inorganic materials. Also heat-resistant organic fillers, such as aramid fibers, polyarylate fibers, polybenzothiazole fibers and aramide powders can be used. In case such components are used, talcum fillers and graphitic fillers are preferred. The amount of addition of this component is preferably 1 to 30 wt % based on the weight of the resin composition.

The thermoplastic resin composition may be prepared by mixing respective components of the thermoplastic resin composition by a kneader, such as a tumbler, V-blender, Nauta mixer, Banbury mixer, kneader roll or an extruder. More preferably, the respective components are melted and kneaded together by an extruder, in particular a twin-screw extruder.

Acrylic Resin

The acrylic resins comprise polymethyl methacrylate or copolymers of methyl methacrylate and one or more other comonomers. Examples of such comonomers are acrylic acid alkylesters, such as methyl acrylate, ethyl acrylate, propyl acrylate, isopropyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, and benzyl acrylate, methacrylic acid alkylesters, such as ethyl methacrylate, propyl methacrylate, isopropyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, and benzyl methacrylate, and co-polymers thereof. Mixtures of the acrylic resins may also be used. Polymethyl methacrylate is the most preferred acrylic resin.

The molecular weight $M_W$ (weight average) of the acrylic resin is preferably 50.000 to 2.000.000 g/mol, more preferably of 60.000 to 1.000.000 gt/mol, most preferably 70.000 to 500.000 g/mol and especially 80.000 to 300.000 g/mol, measured by light scattering.

These acrylic resins may also be used in blends with above polycarbonates. The amount of the acrylic resin in this case is preferably less than 50 wt %. More preferably less than 20 wt %, especially preferred less than 10 wt % based on the total composition.

In blends with polycarbonate the acrylic resin may also be an acrylic resilient material. In this case it is composed of acrylate rubber components as essential components, methyl methacrylate, alkyl acrylates, with C1 to C8 alkyl groups, and vinyl monomers copolymerizable therewith, as necessary, as copolymer components. In such acrylic resilient material, the amount of methyl methacrylate is 15 to 65 wt % in 100 wt % of the resilient material.

The acrylate rubber contains C2 to C10 alkyl acrylate and, as components copolymerizable therewith, styrene, methyl methacrylate or butadiene, as necessary.

As C2 to C10 alkyl acrylate, 2-ethyl hexylacrylate and n-butylacrylate is preferred. This alkyl acrylate is preferably contained in an amount of 50 wt % in 100 wt % of the acrylate rubber. Also preferably, the acrylate rubber is cross-linked at least partially. The cross-linkage agents used for cross-linking may, for example, be enumerated by ethylene glycol diacrylate, butylene glycol diacrylate, ethylene glycol dimethacrylate, allyl methacrylate and polypropylene glycol diacrylate. Preferably, 0.01 to 3 wt % of these cross-linking agents are used in the acrylate rubber.

As a preferred form of the acrylic resilient material, it may preferably be a core shell structure and a multi-layered structure obtained on polymerizing the acrylate rubber component, methyl methacrylate, alkyl acrylate with C1 to C8 alkyl groups, styrene and vinyl monomers copolymerizable therewith, in multiple layers, as necessary. This acrylic resilient material may be prepared by any known methods, such as block polymerization, suspension polymerization, block-suspension polymerization, solution polymerization or emulsion polymerization. The multi-layered structure may also contain a component not grafted on the graft base in multi-stage polymerization.

These resilient acrylic resins when used in blends with above polycarbonates preferably are used in less than 10 wt % of the total composition. More preferably their content is less than 5 wt %.

Polystyrene Resin

Styrenic resins which are suitable according to the invention are homopolymers of styrene, styrene co-polymers or styrenic thermoplastic elastomers or blends, for instance blends of polystyrene and polyphenylene-oxides. Those materials come in several forms, but for the most part include co-polymers comprising Styrene, Isoprene, and Butadiene. The copolymers include triblocks such as S-B-S, S-I-S, S-EB-S, and S-EP-S; alternating block copolymers such as (S-I); branched block copolymers such as (S-B) and (S-I) and triblock/diblock blends (e.g. S-B-S/S-B).

These styrenic resins can be prepared according to the known rules of polymerization and by known procedures. The styrene polymers, for example, can be prepared by the method of Houben Weyl, Methods of Organic Chemistry, 4th Edition, Vol. XIV/1, pp. 761-841, Georg Thieme-Verlag (1961). They are also available on the market in suitable form. Free radical procedures are preferred, but ionic polymerization procedures can also be used. The molecular weights $M_W$ of the polymers used pursuant to the invention are usually above 2000, preferably in the range of 5000 to 5,000,000, and with special preference in the range of 20,000 to 200,000 Daltons. (Determined by light scattering; cf. Ullmann's Encyclopedia of Industrial Chemistry, 4th Edition, Vol. 15, pp. 285-387, Verlag Chemie 1978).

The homopolymers and copolymers may also be prepared by known procedures. (Cf. H. Rauch-Puntigam, Th. Volker, Acrylic and Methacrylic Compounds, Springer-Verlag 1967). Even though it is possible in principle to prepare them by anionic polymerization or group transfer polymerization (see also O. W. Webster et al., J. Am. Chem. Soc., 105, 5706 (1983)), nevertheless the preferred form of preparation is free radical polymerization.

The molecular weights $M_W$ (weight average) of the styrenic thermoplastic elastomers are in general higher than 2000, generally in the range of 10,000 to 2,000,000, preferably 20,000 to 200,000 Daltons, measured by light scattering.

In more detail, examples of above block copolymers can be:

Block copolymers on basis of vinyl aromatic compounds, preferred polystyrene (S-blocks) and polymer blocks manufactured by polymerization of 1,3-dienes preferred like butylene, isobutylene, ethylene-butylene copolymer blocks, ethylene-propylene copolymer blocks or isoprene units. Homo- as well as copolymer blocks are usable according to the invention. The resulting block co-polymers possibly incorporate the same or different elastomer blocks. The elastomer blocks like B-blocks have to be completely or nearly completely hydrated. The block copolymers exhibit preferably a linear structure like a S-B-S structure. Usable are also block copolymers having a radial structure or star-shaped structure or consists of linear multi-block copolymers. Also included are two block copolymers like S-B polymers. All mentioned polymers could be used exclusively or in combination. Especially preferred are styrene-ethylene/butylene-styrene triblock copolymers (S-EB-S), styrene-ethylene/propylene-diblock copolymers (S-EP) and styrene ethylene/butylenes-diblock copolymers (S-EB).

Further examples of above copolymers include block copolymers of above mentioned block copolymers wherein the elastomer blocks or at least a part of the elastomer blocks are functionalized with maleic anhydride. The maleic anhydride content is preferably 0.2 to 4% by weight based on the entire block copolymer. Especially preferred is an anhydride content of 0.5 to 2%.

Further examples comprising useful copolymers according to the present invention are alkylene copolymers like ethylene/propylene rubber or ethylene/octene copolymer, preferred functionalized with maleic anhydride. Preferred are a content of maleic anhydride of 1 to 4%.

Not limiting examples for commercially available copolymers of above mentioned compounds are maleic anhydride functionalized ethylene copolymer like Exxelor VA 1801, Exxelor VA 1803 or Exxelor VA 1840 of ExxonMobil Chemical. Linear functionalized triblock-copolymers based on styrene and ethylene/butylenes copolymers like Kraton FG 1901X and Kraton FG1924X of Kraton Polymers. Linear triblock copolymers like Kraton G1651 and Kraton G1652 of Kraton Polymers. Polyolefine elastomer based on ethylene-octene copolymers like Engage 8411, 8440, 8842 of Dow Chemical Examples for polycarbonates or copolycarbonates are Makrolon or Apec of Bayer Materialscience AG.

Preferred resin compositions or blends according to the invention consist of polycarbonate and/or copolycarbonate as described above and 0.2 to 30 and preferred 1 to 15% by weight of above block copolymers Furthermore polymers from the group of the amorphous polyolefines may also be used. Such polymers are resulting from polymerization of cyclic olefines, from ring opening polymerization of cyclic olefines as well as special hydrogenated polyolefines like hydrogenated polystyrene-based polymers.

Polycycloolefinic Resin

Polymers of cyclic olefines for instance may be polymerization products from olefines with a norbonene structure like norbornene itself, tetracyclododecene, vinylnorbornene or norbornadiene. It can be also copolymers of such olefines with a norbonene structure with olefines, for example copolymers from ethylene and norbornene and ethylene and tetracyclododecene. Such products for instance are described in the Japanese Patent Application Kokai (Laid-Open) No. 292, 601/86, Japanese Patent Application Kokai (Laid-Open) No. 26,024/85, Japanese Patent Application Kokai (Laid-Open) Nos. 19,801/87 and 19,802/87 as well as in EP-A 317 262 and EP-A 532 337.

Hydrogenated Polystyrene Resin

Hydrogenated polystyrene-based polymers may be of a linear or a star-like branched structure. Linear types are for instance described in JP-B 7-114030, polymers with star-like branched structure are described for instance in WO 0148031.

As substrate resins, also blends of above polymers can be used. Suitable additives like thermostabilizers, release agents and the like as well as fillers may also be added to the acrylic resins, polystyrene resins, polycycloolefine resins and hydrogenated polystyrene resins.

6. GENERAL DESCRIPTION OF THE LIGHT TRANSMITTING LAYER

The light transmitting layer is in general a UV-curable and spin coatable resin having a real part of the index of refraction of at least 1.41 measured at 405 nm. The resin may be comprised of binder and reactive thinner molecules and further additives like e.g. a UV initiator or solvents. Typical photo-initiators (UV initiators) are α-hydroxy ketones such as 1-hydroxy-cyclohexyl-phenyl-ketone (Irgacure® 184, Ciba) or such as 2-hydroxy-2-methyl-1-phenyl-1-propanone (Darocur 1173®, Ciba), or monoacylphosphines such as 2,4,6-trimethylbenzoyl-diphenyl-phosphineoxide (Darocur® TPO, Ciba). The binder molecules can be chosen for example from the classes of Urethaneacrylates or polyetheracrylates. The reactive thinners can be chosen from the classes of ethoxylated alkyl acrylates, ethoxylated phenyl acrylates, cycloaliphatic acrylic acid esters and heterocyclic acrylic acid esters.

7. GENERAL DESCRIPTION OF THE LIGHT TRANSMITTING LAYER AS A HIGH REFRACTION INDEX LAYER COATING A (HRI)

The coating A is obtainable from the casting solution A*, the casting solution A* being applied to a substrate (S) or to an information and recording layer (B) and crosslinked.

Component A* (Casting Solution)

The casting solution A* according to the invention contains the following components:

A1: a suspension containing nanoparticles and a mixture of water and at least one organic solvent,
A2: a binder
and optionally
A3: further additives.

Within the scope of the present invention, nanoparticles are understood as being particles that have a mean particle size ($d_{50}$) of less than 100 nm, preferably from 0.5 to 50 nm, particularly preferably from 1 to 40 nm, very particularly preferably from 5 to 30 nm. Preferred nanoparticles additionally have a $d_{90}$ value of less than 200 nm, in particular less than 100 nm, particularly preferably less than 40 nm, very particularly preferably less than 30 nm. The nanoparticles are preferably in monodisperse form in the suspension. The mean particle size $d_{50}$ is the diameter above and below which in each case 50 wt. % of the particles lie. The $d_{90}$ value is the diameter below which 90 wt. % of the particles lie. Laser light scattering or, preferably, the use of analytical ultracentrifugation (AUC) are suitable for determining the particle size and demonstrating monodispersity. AUC is known to the person skilled in the art, as described, for example, in "Particle Characterization", Part. Part. Syst. Charact., 1995, 12, 148-157.

For the preparation of component A1 (a suspension containing nanoparticles and a mixture of water and at least one organic solvent), aqueous suspensions of nanoparticles of $Al_2O_3$, $ZrO_2$, $ZnO$, $Y_2O_3$, $SnO_2$, $SiO_2$, $CeO_2$, $Ta_2O_5$, $Si_3N_4$, $Nb_2O_5$, $NbO_2$, $HfO_2$ or $TiO_2$ are suitable, an aqueous suspension of $CeO_2$ nanoparticles being particularly suitable. Particularly preferably, the aqueous suspensions of the nanoparticles contain one or more acids, preferably carboxylic acids RC(O)OH wherein R=H, $C_1$- to $C_{18}$-alkyl, which may optionally be substituted by halogen, preferably by chlorine and/or bromine, or $C_5$- to $C_6$-cycloalkyl, $C_6$- to $C_{20}$-aryl or $C_7$- to $C_{12}$-aralkyl, each of which may optionally be substituted by $C_1$- to $C_4$-alkyl and/or by halogen, preferably chlorine, bromine. R is preferably methyl, ethyl, propyl or phenyl and particularly preferably is ethyl. The nanoparticle suspension may also contain as the acid mineral acid, such as, for example, nitric acid, hydrochloric acid or sulfuric acid. The aqueous suspensions of the nanoparticles preferably contain from 0.5 to 10 parts by weight, particularly preferably from 1 to 5 parts by weight, of acid, based on the sum of the parts by weight of acid and water. For example, the nanoparticle suspensions NanoCeria® $CeO_2$-ACT (an aqueous suspension of $CeO_2$ nanoparticles stabilised with acetic acid, pH value=3.0) and $CeO_2$-NIT (an aqueous suspension of $CeO_2$ nanoparticles stabilised with nitric acid, pH value=1.5) from Nyacol NanoTechn., Inc., USA are suitable.

Some of the water from these aqueous suspensions is replaced by at least one organic solvent. This partial solvent exchange is carried out by means of distillation or by means of membrane filtration, preferably by means of ultrafiltration, for example according to the "cross-flow" process. Cross-flow ultrafiltration is a form of ultrafiltration on an industrial scale (M. Mulder: Basic Principles of Membrane Technology, Kluwer Acad. Publ., 1996, 1st Edition), in which the solution to be filtered (feed solution) flows tangentially through the membrane. There is used for this solvent exchange preferably at least one solvent selected from the group consisting of alcohols, ketones, diketones, cyclic ethers, glycols, glycol ethers, glycol esters, N-methylpyrrolidone, dimethylformamide, dimethyl sulfoxide, dimethylacetamide and propylene carbonate. Preference is given to the use of a solvent mixture of at least two solvents from the above-mentioned group, a solvent mixture of 1-methoxy-2-propanol and diacetone alcohol particularly preferably being used. Particular preference is given to the use of a solvent mixture of 1-methoxy-2-propanol (MOP) and diacetone alcohol (DAA), preferably in a ratio of from 95:5 to 30:70, particularly preferably from 90:10 to 50:50. Water may be present in the solvent that is used, preferably in an amount of up to 20 wt. %, more preferably in an amount of from 5 to 15 wt. %.

In a further embodiment of the invention, the suspension of the nanoparticles is prepared by solvent exchange in at least one of the above-mentioned organic solvents and then a further solvent is added, this further solvent being selected from the group consisting of alcohols, ketones, diketones, cyclic ethers, such as, for example, tetrahydrofuran or dioxane, glycols, glycol ethers, glycol esters, N-methylpyrrolidone, dimethylformamide, dimethyl sulfoxide, dimethyl-acetamide, solketal, propylene carbonate and alkyl acetate, for example butyl acetate. In this embodiment too, water may be present in the solvent used, preferably in an amount of up to 20 wt. %, more preferably in an amount of from 5 to 15 wt. %.

Preference is given to the use of ultrafiltration membranes made of polyether polysulfone, which preferably have a cut-off of less than 200,000 D, preferably less than 150,000 D, particularly preferably less than 100,000 D. The cut-off of a membrane is defined as follows: molecules of the corresponding size (for example 200,000 D and larger) are retained, while molecules and particles of smaller sizes are able to pass through ("Basic Principles of Membrane Technology", M. Mulder, Kluwer Academic Publishers, 1996, 1st Edition). Such ultrafiltration membranes retain the nanoparticles even at high flow rates, while the solvent passes through. According to the invention, the solvent exchange takes place by continuous filtration, the water that passes through being replaced by the corresponding amount of solvent or solvent mixture. As an alternative to polymer membranes it is also possible to use ceramics membranes in the process step of solvent exchange.

The process according to the invention is characterised in that the replacement of water by one of the above-mentioned organic solvents or solvent mixtures does not fall below a limiting value of 5 wt. % in the resulting nanoparticle suspension (component A1). Preferably, the replacement of water by the organic solvent or solvent mixture is so carried out that the resulting nanoparticle suspension (component A1) has a water content of from 5 to 50 wt. %, preferably from 7 to 30 wt. %, particularly preferably from 10 to 20 wt. %. The resulting nanoparticle suspension preferably contains from 1 to 50 wt. %, more preferably from 5 to 40 wt. %, particularly preferably from 15 to 35 wt. % nanoparticles (referred to hereinbelow as the nanoparticle solids fraction).

If the solvent exchange of the nanoparticle suspension at the membrane cell is carried out for longer, so that a water content of less than 5 wt. % results, particle aggregation occurs, so that the resulting coating does not meet the conditions of monodispersity and high transparency. If, on the other hand, the water content in the organically based nanoparticle suspension is greater than 50 wt. %, the binders that are to be used in a subsequent step may no longer be dissolved in the water-containing suspension to give a clear solution, so that in both these cases, that is to say with agglomerated nanoparticles or with binders that have not dissolved to give a clear solution, the resulting coatings do not fulfil the simultaneous requirement for a high refractive index n and high transparency.

As binders (component A2) there may be used both non-reactive, thermally drying thermoplastics, for example polymethyl methacrylate (Elvacite®, Tennants) or polyvinyl acetate (Mowilith 30®, Synthomer), and reactive monomer components which, after coating, may be reacted by a chemical reaction or by means of a photochemical reaction to give highly crosslinked polymer matrices. For example, crosslinking is done by UV radiation. Crosslinking by means of UV radiation is particularly preferred in view of increased scratch resistance. The reactive components are preferably UV-crosslinkable acrylate systems, as are described, for example, in P. G. Garratt in "Strahlenhärtung" 1996, C. Vincentz Vlg., Hannover. The binder (component A2) is preferably selected from at least one of the group consisting of polyvinyl acetate, polymethyl methacrylate, polyurethane and acrylate. The binder (component A2) is particularly preferably selected from at least one of the group consisting of hexanediol diacrylate (HDDA), tripropylene glycol diacrylate, dipentaerythritol pentaacrylate, dipentaerythritol hexaacrylate (DPHA), ditrimethylolpropane tetraacrylate (DTMPTTA), tris-(2-hydroxyethyl)-isocyanurate triacrylate, pentaerythritol triacrylate, tris-(2-hydroxyethyl)-isocyanurate triacrylate and hexanediol diacrylate (HDDA).

The components used as further additives (component A3) in the casting solution are preferably at least one additive selected from the group of the photoinitiators and thermoinitiators. Based on the sum of the parts by weight of the components of the casting solution, up to 3 parts by weight of additives (component A3) are used, preferably from 0.05 to 1 part by weight, particularly preferably from 0.1 to 0.5 part by weight. Typical photoinitiators (UV initiators) are α-hydroxy ketones (Irgacure® 184, Ciba) or monoacylphosphines (Darocure® TPO, Ciba). The amount of energy (energy of the UV radiation) required to initiate the UV polymerisation is in the range of approximately from 0.5 to 4 J/cm², particularly preferably in the range from 2.0 to 3.0 J/cm² of coated surface. Also suitable as further additives are so-called coating additives, as are supplied, for example, by Byk/Altana (46483 Wesel, Germany) under the names BYK, for example BYR 344®.

The casting solution A* for the high refractive index coatings according to the invention is prepared by dissolving at least one binder (component A2) and optionally further additives (component A3) in an organic solvent or solvent mixture, which may contain water. The resulting solution (referred to hereinbelow as the binder solution) is mixed with component A1 and optionally filtered and degassed. In a preferred embodiment, component A1 contains the same organic solvent or solvent mixture as the binder solution.

The casting solution A* preferably has the following composition:
- from 12 to 30 parts by weight, preferably from 13 to 25 parts by weight, particularly preferably from 14 to 19 parts by weight, nanoparticle solids fraction,
- from 2 to 8 parts by weight, preferably from 2.5 to 5 parts by weight, binder,
- from 0 to 3 parts by weight, preferably from 0.05 to 1 part by weight, particularly preferably from 0.1 to 5 parts by weight, further additives (component A3),
- from 7 to 28 parts by weight, preferably from 15 to 27 parts by weight, particularly preferably from 20 to 26 parts by weight, water and
- from 32 to 79 parts by weight, preferably from 42 to 70 parts by weight, particularly preferably from 50 to 63 parts by weight, organic solvent, the sum of the parts by weight of the components being normalized to 100.

The casting solution A* generally has a solids content of from 10 to 50 wt. %, preferably from 14 to 28 wt. %. The solids content of the casting solution A* is the sum of components A2, A3 and the nanoparticle solids fraction. The ratio of binder (component A2) to nanoparticle solids fraction in the casting solution is preferably from 40:60 to 7:93, particularly preferably the ratio is from 26:74 to 12:88.

The layer thickness of the coating A is from 1 nm to 3000 nm, preferably from 200 nm to 2000 nm, particularly preferably from 500 nm to 1500 nm. The layer thickness may be adjusted by the solids content of the casting solution, in particular in the case of the spin coating process. If high layer thicknesses of the coating are desired, a higher solid content of the casting solution is used; if thinner coatings are desired, a low solids content of the casting solution is used.

The properties of the coating A of the coated product were determined as follows: The real component n and the imaginary component k of the complex refractive index were measured at a wavelength of from 400 to 410 nm (i.e. in the wavelength range of blue laser). The surface roughness was measured as the $R_a$ value by means of AFM (atomic force microscopy). For determining the scratch resistance, a diamond needle with a tip radius of 50 µm was moved over the coating at a rate of advance of 1.5 cm/s and with an applied weight of 40 g, and the resulting scratch depth was measured. Details of the respective measuring methods are given in the section relating to the production and testing of the coated products.

Substrate S

The substrate (S) is a disc shaped article that is fabricated from polymer resins described above and by processes described below. By applying sequentially at least one recording layer and one light transmitting layer to that substrate, the optical recording medium is formed.

8. DESCRIPTION OF THE PROCESS TO PRODUCE THE SUBSTRATE OF THE OPTICAL RECORDING MEDIUM

To produce a substrate from the above resin for an optical recording medium, an injection molding machine (including an injection compression molding machine) equipped with a disc mold and a respective stamper having pits and grooves which satisfy specifications required for an optical recording medium and a with a low enough surface roughness is used to form an optical disk substrate by injection molding. The thickness of the disk substrate is 0.3 to 2.0 mm. This injection molding machine may be a generally used machine but preferably a machine made from a material whose cylinder and screws have low adhesion to resins, corrosion resistance and abrasion resistance in order to suppress the production of carbide and improve the reliability of a disk substrate.

The environment of the molding step is preferably as clean as possible in view of the object of the present invention. It is also important that the material to be molded should be fully dried to remove water and that residence which might cause the decomposition of a molten resin should be avoided.

The resin for an optical disk substrate of the present invention preferably has sufficiently high flowability which is advantageous for transcribility during injection molding or injection compression molding.

An optical recording medium can be produced by forming at least a reflection film on at least one side of the substrate of the present invention. The material of the reflection film is elemental metal or composite metal. Al or Au is used alone, or an Al alloy containing Ti in an amount of 0.5 to 10 wt %, preferably 3.0 to 10 wt % or an Al alloy containing Cr in an amount of 0.5 to 10 wt % is preferably used. The reflection film can be formed by physical vapour deposition, ion beam sputtering, DC sputtering or RF sputtering. Only this metal thin film (reflection layer) is sufficient for a prerecorded optical recording medium of the present invention, but a recording layer (e.g. a phase change film and a dye in the case of rewriteable or recordable and a recordable optical recording medium, and a magnetic-optical recording film in the case of an magneto-optical optical recording medium) and a light transmitting layer can be formed besides the reflection layer to obtain a rewriteable or recordable optical recording medium of the present invention.

The phase change film recording material layer is made from chalcogen alone or a chalcogen compound. Specifically, Te, Se or chalcogenite-based material such as Ge—Sb—Te, Ge—Te, In—Sb—Te, InSe—Te—Ag, In—Se, In—Se—Tl—Co, In—Sb—Se, $Bi_2Te_3$, BiSe, $Sb_2Se_3$ or $Sb_2Te_3$ may be used.

A vertically magnetized film having magneto-optic properties including Kerr effect or Faraday effect, such as an amorphous alloy thin film of Tb—Fe—Co is used as the magneto-optical recording film layer.

The light transmitting layer is formed on the recording layer. The light transmitting layer is made from material that transmits laser light and is described more specifically in the sections general description of the light transmitting layer and general description of the light transmitting layer as high refraction index layer coating a (HRI)

The process to form the light transmitting layer is described more specifically in the sections process for the production of the light transmitting layer and process for the production of the light transmitting layer as a high refractive index layer. Further, the thickness of light transmitting layer is limited to 1 nm to 3000 nm, preferably to 200 nm to 2000 nm, particularly preferably to 500 nm to 1500 nm, in order to suppress spherical- and chromatic aberrations.

The basic constitution of the optical recording medium of the present invention has been described above. Dielectric layers might be added to the above constitution to control the optical properties and thermal properties of the optical recording medium. In this case, the light reflection layer, first dielectric layer, recording layer, second dielectric layer and a light transmitting layer, can be formed on the substrate in the mentioned order. In addition the optical recording medium of the present invention described above is not limited to only one layer stack on the substrate that is comprised of the different layers mentioned above. It could also have multiple layer stack each separated by a spacer layer made out of materials that can be used also for the light transmitting layer. Single Component Injection Molding Process (1-K Molding) (as Used in the Examples)

In the following a production of a standard 1-K molded substrate of the optical recording medium of the present invention is described, said method was used in the experimental part and is not limiting to the scope of the invention if the substrate satisfies the requirements of the Youngs modulus E and the Q factor. A disk substrate having a diameter of 120 mm and a thickness of 1.2 mm is injection molded from each pellet using a Sumitomo SD 40E injection molding machine equipped with a mold AWM5237 and a BD-ROM stamper. Alternatively an Arburg 420 C Allrounder 1300-350 injection molding machine, equipped with a Philips CD-Mould and a BD-ROM stamper is used.

To form the respective optical recording medium, a reflection layer (50 nm Ag) is formed on the 1-K molded substrate by physical vapor deposition (Leybold A1100) or by DC sputtering (Reuter LP 800). On that reflection layer and a light transmitting layer of the HRI type is formed according to the process described above.

To form a test beam for measurement of Youngs modulus E and quality factor Q according to ASTM E 756-05, the beam can be cut out of the respective substrate of the optical recording medium, or the substrate covered with the recording layer stack or the substrate covered with the recording layer stack and the light transmitting layer, or by direct 1-K injection molding of the test beam from the respective resin used for the substrate of the present invention.

9. DESCRIPTION OF THE PROCESS FOR THE PRODUCTION OF THE LIGHT TRANSMITTING LAYER

The resin is applied to the surface of the substrate or to the surface of the information and recording layer by spin coating. Subsequent crosslinking of the resin may be carried out on a UV exposure apparatus, for example: To this end, the coated substrate is placed on a conveyor belt, which is moved past the UV light source (Hg lamp, 80 W) at a speed of about 1 m/minute. This process may also be repeated in order to influence the radiation energy per $cm^2$. A radiation dosage of at least 1 $J/cm^2$, preferably from 2 to 10 $J/cm^2$, is preferred. The coated substrate may then be subjected to thermal post-treatment, preferably with hot air, for example for from 5 to 30 minutes at a temperature of 60° C. to 120° C.

10. DESCRIPTION OF THE PROCESS FOR THE PRODUCTION OF THE LIGHT TRANSMITTING LAYER AS A HIGH REFRACTIVE INDEX LAYER (HRI)

The coating (A) is obtainable by the following steps:
i) replacing some of the water contained in an aqueous nanoparticle suspension by at least one organic solvent, so that the resulting nanoparticle suspension (component A1) has a water content of from 5 to 50 wt. %,
ii) adding of at least one binder (component A2) to the nanoparticle suspension (component A1) to give a casting solution (A*),
iii) applying the casting solution (A*) to a substrate (S) or to an information and recording layer (B), and
iv) crosslinking the casting solution (A*) by thermal or photochemical methods.

Preferably, after step iii) residual solvent is removed completely or partially from the substrate (S) covered with the casting solution (A*) and/or a thermal post treatment is applied to the coating obtained after step iv).

The casting solution A* is optionally treated with ultrasound for up to 5 minutes, preferably for from 10 to 60 seconds, and/or filtered through a filter, preferably with a 0.2 μm membrane (e.g. RC membrane, Sartorius). Ultrasonic treatment can be applied to destroy nanoparticle agglomerates if present.

The casting solution is applied to the surface of the substrate or to the surface of the information and recording layer. After removal of excess casting solution, preferably by spinning, a residue of the casting solution remains on the substrate, the thickness of which residue is dependent on the solids content of the casting solution and, in the case of spin coating, on the spin conditions. Some or all of the solvent contained in the casting solution may optionally be removed, preferably by thermal treatment. Subsequent crosslinking of the casting solution, or of the residue, is carried out by thermal methods (for example using hot air) or photochemical methods (for example UV light). Photochemical crosslinking may be carried out on a UV exposure apparatus, for example: To this end, the coated substrate is placed on a conveyor belt, which is moved past the UV light source (Hg lamp, 80 W) at a speed of about 1 m/minute. This process may also be repeated in order to influence the radiation energy per $cm^2$. A radiation dosage of at least 1 $J/cm^2$, preferably from 2 to 10 $J/cm^2$, is preferred. The coated substrate may then be subjected to thermal post-treatment, preferably with hot air, for example for from 5 to 30 minutes at a temperature of 60° C. to 120° C.

The invention accordingly further provides a process for the production of a light transmitting layer, comprising the following steps:
i) preparation of a monodisperse nanoparticle suspension in at least one organic solvent, starting from an aqueous nanoparticle suspension, the water present in the aqueous nanoparticle suspension being removed and at the same time being replaced by at least one organic solvent, so that the nanoparticle suspension has a water content of from 5 to 50 wt. %,
ii) addition of at least one binder (component A2) and optionally further additives (component A3) to the nanoparticle suspension (component A1) to give a casting solution (A*),
iii) application of the casting solution from ii) to a substrate or to an information and recording layer (B), iv) optional removal of some or all of the solvent contained in the casting solution, preferably by thermal treatment, to give a residue on the substrate,
v) crosslinking of the casting solution, or of the residue, by thermal or photochemical methods, and
vi) optional thermal treatment of the coating, preferably at from 60 to 120° C.

11. DESCRIPTION OF THE TESTING PROCEDURES

Measurement of the Youngs Modulus E and the Quality Factor Q

Figure 1:
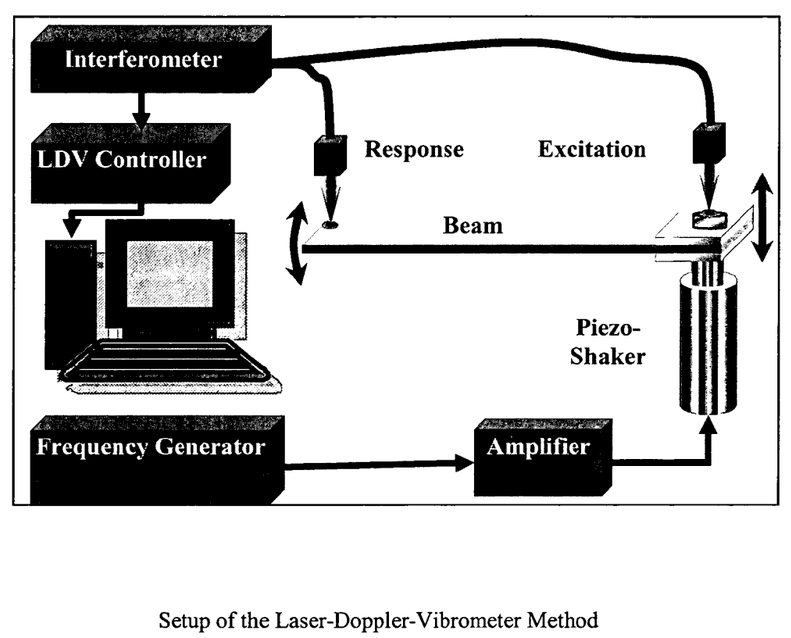
FIG. 1 illustrates the setup of the Laser-Doppler Vibrometer method.

To determine the Young's modulus E and the damping related factor Q (quality factor) of the materials in the frequency range from about 10 Hz to 10 KHz, a set up that is analogue to what is described in ASTM E 756-05 (FIG. 1) is used. This measurement principle is based on the evaluation of the resonance frequencies $f_n$ of an oscillating beam of the material of interest. To excit the resonance frequencies the beam is clamped on one side to a Piezo-shaker, which is driven by an analog white noise signal with a range stretching from 1 mHz to 10 KHz. The beam response to that exciation e.g. the velocity versus frequency measured with a Laser-Doppler-Vibrometer (LDV) at the tip of the beam that is not clamped to the Piezo-shaker normalized to e.g. the velocity versus frequency of the excitation at the end of the beam that is clamped to the Piezo-shaker is recorded. Form this response curve E and Q are calculated as follows:

$$E = \frac{12 \rho l^4 f_n^2}{H^2 C_n^2} \quad \text{Equation 1}$$

$$Q = \frac{2 f_n}{\Delta f_n} \quad \text{Equation 2}$$

with:
E=Young's modulus of beam material in Pa,
$f_n$=the resonance frequency for mode n in Hz,
$\Delta f_n$=the half-power at full bandwidth (FWHM) of mode n in Hz,
$C_n$=coefficient for mode n of a clamped-free (uniform) beam,
H=thickness of beam in oscillation direction in meter,
l=length of beam in meter,
n=mode number: 1, 2, 3, . . . ,
Q=Quality factor of the beam material, dimensionless,
$\rho$=mass density of the beam in kg/m$^3$.

E.g. the beam can be cut out of a disc, that was fabricated according to the procedures described above or can be injection molded. This description shall not restrict the way how to fabricate the beam, at least the layer structure viewed in the direction of the beam thickness is the same. The width W of the beam is chosen to be 0.013 m and the length l is chosen, so that the resonance frequencies fit well to the measured frequency range of 10 Hz to 10 kHz. The values of E and Q at 2000 Hz are calculated via linear interpolation using the respective values extracted from equation 1 and equation 2 at the measured $f_n$ below 2000 Hz and the measured $f_{n+1}$ above 2000 Hz.

Pit Height Measurement with AFM

The pit height was measured via an Atomic Forve Microscope in tapping mode.

Surface Roughness with AFM

The surface roughness is given as $R_a$, measured via an Atomic Forve Microscope in Tapping Mode according to ASTM E-42.14 STM/AFM.

Mass Density

The mass density $\rho$ was measured with the Mettler density kit Mettler AT 250 H66765 at room temperature using ethanol as the immersing liquid, on samples cut out of the disks. Or alternatively a rectangular piece of the disc of known width W, known height H and know length l was cut out of the disc. The mass m of the rectangular piece of the disc was determined by weighing with a balance (e.g. Mettler AT 250) and $\rho$ was calculated via $\rho = m/(l \cdot H \cdot W)$.

Measurement of the Complex Index of Refraction n*=n+i k

The real component n of the complex index of refraction n* and the imaginary component k of the complex index of refraction (also referred to hereinbelow as the absorption constant k) of the coatings are obtained from their transmission and reflection spectra. To achieve these spectra, about 100-300 nm thick films of the coating were applied by spin coating from dilute solution to quartz glass carriers. The transmission and reflection spectrum of this layer structure are measured by means of a spectrometer from STEAG ETA-Optik, CD-Measurement System ETA-RT and then the layer thickness of the coating and the spectral dependency of n and k are fitted to the measured transmission and reflection spectra. The fitting is done using the internal software of the spectrometer which requires the spectral dependency of n and k of the quartz glass substrate, which was determined previously in a blank measurement. k is related to the decay constant $\alpha$ of the light intensity as follows:

$$k = \frac{\lambda \cdot \alpha}{4\pi} \quad \text{Equation 4}$$

$\lambda$ is the wavelength of the light.

Measurement of the Scratch Resistance

In order to determine the scratch resistance of the coating on a disc substrate, scratches are made in the radial direction of that coated substrate, from inside to outside, using a diamond needle with a tip radius of 50 µm, at a rate of advance of 1.5 cm/s and with an applied weight of 40 g. The scratch depth is measured using an Alpha Step 500 step profiler from Tencor. This scratch depth is taken as a measure of the scratch resistance. A small value of the scratch depth means a high scratch resistance of the corresponding coating.

Measurement of the Water Content of the Coating Solution

The water content of the coating solution is determined by the method of Karl Fischer.

Measurement of the Thickness of the Light Transmitting Layer

For the thickness range of 1 nm to 1500 nm the light transmitting layer is applied with the identical process as it is applied to the substrate of the optical recording medium of the present invention on a transparent BPA-polycarbonate CD-substrate, said substrate was molded with a blank stamper (no pits and grooves are present). The transmission and reflection spectrum of this layer structure is measured by means of a spectrometer from STEAG ETA-Optik, CD-Measurement System ETA-RT and then the layer thickness of the coating is fitted to the measured transmission and reflection spectra. The fitting is done using the internal software of the spectrometer which requires the spectral dependency of n and k of the polycarbonate substrate, which was determined previously in a blank measurement and the n and k of the light transmitting layer, which were determined according to the description in Measurement of the complex index of refraction n*=n+i k.

For the thickness range of 1500 nm to 150000 nm the thickness of the light transmitting layer that was applied to the substrate of the optical recording medium is measured by means of the CD-Measurement System ETA-RT with the modul "ETA-DVR Measuring System for Blu-ray/Digital Video Recording (DVR) Disks". For that the real part n of the complex index of refraction of the light transmitting layer is required which was determined according to the description in Measurement of the complex index of refraction n*=n+i k.

Measurement of the Transcriptability

The pit depth $d_R$ of the injection molded substrate with the replicated pit structure was measured with the AFM in the tapping mode. The pit depth of the stamper $d_S$ was measured in the same way. The transcriptability t is then calculated via:

$$t=d_R/d_S*100\%$$

Measurement of the Radial Deviation

The radial deviation measures the angular deviation of the disc surface from a reference plane. It is defined as the angle measured in radial direction, between incident light perpendicular to the reference plane and the reflected light. The radial deviation of the disc was measured using an offline optical disk scanner from Dr. Schenk Prometheus MT 200.

Measurement of $T_g$ with Dynamic Mechanical Analysis (DMA)

The storage G' and loss modulus G" was measured in shear according to IEC 1006 using a test specimen with the dimensions of $80 \times 10 \times 4$ mm$^3$ in the temperature range of 0° C. to 260° C. The heating rate was set to 20 K/min and the oscillation frequency was set to 1 Hz. The Tg was extracted from the point of steepest descent of the G' in a log-log scaled plot.

12 EXAMPLES

The present invention is now explained with reference to several numerical examples, based on experimental results. However, the substrates of the present invention forming the optical recording medium are not limited to the following examples if the substrates satisfy the requirements of the Youngs's modulus E and the Q factor for optical recording medium.

Substrate Materials

Substrate Materials Filled with Talcum, Examples No. 1 to 7

Compounds no. 1 to 7 were made of Bisphenol A (BPA)-polycarbonate with a solution viscosity of 1.202 (Makrolon OD 2015®, Bayer MaterialScience), polymethymethacrylate (PMMA 6N®, Degussa), talcum (Finntalc MO5SL®, Mondo Minerals, Helsinki/Finland) having a hardness of 1 according to the Mohs scale, glycerinmonostearate (Dimodan, Danisco/Germany) and optionally other additives like bis(2-ethylhexyl)phosphate (CAS-no. 298-07-7, Alfa Aesar GmbH&Co KG, Karlsruhe/Germany) in weight-% ratios according to the table 1 below. The materials were compounded by a ZSK 25/4 extruder (Coperion Holding GmbH, Stuttgart/Germany) and the melt strands were pelletized after cooling in a water bath.

TABLE 1

| | recepies of examples 1 to 7 | | | | |
|---|---|---|---|---|---|
| No. | Makrolon ® OD2015 Weight % | PMMA 6N Weight % | Finntalc MO5SL Weight % | Bis(2-Ethylhexyl) phosphat ppm | Glycerinmono-stearate ppm |
| 1 | 94.936 | 1.66 | 5 | 140 | 250 |
| 2 | 94.936 | 1.66 | 5 | 140 | 250 |
| 3 | 89.99 | 2.5 | 7.5 | 500 | 500 |

TABLE 1-continued

| | recepies of examples 1 to 7 | | | | |
|---|---|---|---|---|---|
| No. | Makrolon ® OD2015 Weight % | PMMA 6N Weight % | Finntalc MO5SL Weight % | Bis(2-Ethylhexyl) phosphat ppm | Glycerinmono-stearate ppm |
| 4 | 86.606 | 3.33 | 10 | 140 | 250 |
| 5 | 79.95 | 5 | 15 | — | 500 |
| 6 | 64.99 | 15 | 20 | 500 | 500 |
| 7 | 59.9 | 10 | 30 | 500 | 500 |

Substrate Materials Filled with Graphite, Examples No. 8 to 13

Compounds no. 8 to 13 were made of BPA-polycarbonate with a solution viscosity of 1.202 (Makrolon OD 2015®, Bayer MaterialScience), polymethymethacrylate (PMMA 6N®, Degussa), graphite Cond 5/99 (Graphit Kropfmühl AG, Hauzenberg/Germany) having a hardness of 1-2 according to the Mohs scale and glycerinmonostearate (Dimodan, Danisco/Germany)) in weight-% ratios according to the table 2 below. The materials were compounded by a ZSK 25/4 extruder (Coperion Holding GmbH, Stuttgart/Germany) and the melt strands were pelletized after cooling in a water bath.

TABLE 2

| | recepies of examples 8 to 13 | | | |
|---|---|---|---|---|
| No. | Makrolon OD2015 Weight % | PMMA 6N Weight % | Graphite Cond 5/99 Weight % | Glycerinmonostearate ppm |
| 8 | 82.95 | 5 | 12 | 500 |
| 9 | 95.37 | 2.08 | 2.5 | 250 |
| 10 | 90.79 | 4.16 | 5 | 250 |
| 11 | 84.95 | 7 | 8 | 500 |
| 12 | 77.95 | 10 | 12 | 500 |
| 13 | 72.95 | 15 | 12 | 500 |

Substrate Materials Filled with Aerosil, Examples No. 14 and 15

Compounds no. 14 and 15 were made of BPA-polycarbonate with a solution viscosity of 1.202 (Makrolon OD 2015®, Bayer MaterialScience), polymethymethacrylate (PMMA 6N®, Degussa), Aerosil® R 9200 (Degussa, Hanau, Germany) and glycerinmonostearate (Dimodan, Danisco/Germany)) in weight-% ratios according to the table 3 below. The particle size distribution (number) of the primary aerosil particles used was characterized by a $d_{50}$ value of 13 nm and a $d_{90}$ value of 17 nm. The materials were compounded by a ZSK 25/4 extruder (Coperion Holding GmbH, Stuttgart/Germany) and the melt strands were pelletized after cooling in a water bath.

TABLE 3

| | recepies of examples no. 14 and 15 | | |
|---|---|---|---|
| No. | Makrolon ® OD2015 Weight % | PMMA 6N Weight % | Aerosil R 9200 Weight % |
| 14 | 85 | 0 | 15 |
| 15 | 77.5 | 7.5 | 15 |

Substrate Material Filled with Barium Sulphate, Example No. 16

Compound no. 16 was made of 95.0 weight-% BPA-polycarbonate with a solution viscosity of 1.202 (Makrolon OD 2015®, Bayer MaterialScience), polymethymethacrylate (PMMA 6N®, Degussa) and 5.0 weight-% barium sulphate nanofine (Solvay Infra, Bad Hönningen/Germany) having a hardness of 3 according to the Mohs scale measured in a bulk sample. The particle size distribution (number) of the barium sulphate primary nanoparticles used was characterized by a $d_{50}$ value of 42 nm. The materials were compounded by a ZSK 25/4 extruder (Coperion Holding GmbH, Stuttgart/Germany) and the melt strands were pelletized after cooling in a water bath.

Other Substrate Materials, Examples No. 17 to 23

Material no. 17 comprises a copolycarbonate made from 50 mol-% 4,4'-(m-phenylene diisopropylidene diphenol and 50 mol-% 1,1-bis(4-hydroxyphenyl)-3,3,5-trimethylcyclohexane, having a relative solution viscosity of 1.20.

Material no. 18 comprises polymethymethacrylate PMMA 6N® from Degussa.

Material no. 19 comprises a copolycarbonate made from 13 weight-% 1,1-bis(4-hydroxyphenyl)-3,3,5-trimethylcyclohexane and 87 weight-% bisphenol A, having a relative solution viscosity of 1,225.

Material no. 20 comprises a polycarbonate made from bisphenol A having a solution viscosity of 1,202.

Material no. 21 comprises a polycarbonate made from bisphenol A having a solution viscosity of 1.24. This material was filled with 12 weight-% of titaniumdioxide (2230, Kronos, Dallas).

Material no. 22 comprises a copolycarbonate made from 70 mol-% 4,4'-(p-hydroxydiphenyl and 30 mol-% of bisphenol A having a relative solution viscosity of 1,294.

Material no. 23 comprises a compound of material no. 20 with 20 weight-% of carbon fibres (carbon fiber Tenax-U Type 234, Toho Tenax Europe GmbH Wuppertal Germany).

Polymer Blends, Examples No. 24 to 26

In the following Makrolon 2808 refers to aromatic polycarbonate based on bisphenol A having a melt volume rate of 10 g/(10 min) (measured according to ISO 1133; 300° C., 1.2 kg) from of Bayer Materialscience AG. Apec 1895 refers to a bisphenol A/1,1-bis-(4-hydroxyphenyl)-3,3,5-trimethylcyclohexane copolycarbonate having a melt volume rate of 18 (measured according to ISO 1133; 330° C., 2.16 kg) from of Bayer Materialscience AG. Apec 2095 refers to a bisphenol A/1,1-bis-(4-hydroxyphenyl)-3,3,5-trimethylcyclohexane copolycarbonate having a melt volume rate of 8 (measured according to ISO 1133; 330° C., 2.16 kg) from of Bayer Materialscience AG. Kraton 1652G refers to a linear triblock copolymer of styrene-ethylene/butylenes-styrene from Kraton Polymers. Sibstar 073T refers to a block copolymer of styrene and isobutylene from Kaneka Corp. The blends were compounded by a ZSK 25/4 extruder (Coperion Holding GmbH, Stuttgart/Germany) and the melt strands were pelletized after cooling in a water bath.

Material no. 24 comprises 95% by weight Makrolon® 2808, 1% by weight Apec® 2095 and 4% by weight Kraton G1652.

Material no. 25 comprises 96% by weight Apec® 1895 and 4% by weight Sibstar® 073T.

Material no. 26 comprises 95% by weight Apec® 1895, 1% by weight Apec® 9379 and 4% by weight Kraton® 1652G.

Molding Process A

A disk substrate having a diameter of 120 mm and a thickness of 1.2 mm is injection molded from above materials using a Sumitomo SD 40E injection molding machine equipped with a mold AWM 5237 and a BD-ROM stamper. Following molding parameters were used, see table 4:

TABLE 4

Molding parameters according to disc molding process A used for the different examples

| No. | $T_{Cyl}$ (° C.) | $T_{Mold}$ (° C.) | Clamp Force (to) | Holding Pressure (kgf/cm²) | Cooling Time (s) | Injection Speed (cm³/s) |
|---|---|---|---|---|---|---|
| 1 | 340 | 127 | 40 | 500 | 11 | 48.7 |
| 9 | 340 | 130 | 40 | 500 | 11.5 | 48.7 |
| 10 | 340 | 130 | 40 | 500 | 11 | 48.7 |
| 11 | 340 | 130 | 40 | 500 | 17 | 48.7 |
| 12 | 310 | 130 | 40 | 500 | 11 | 48.7 |
| 13 | 310 | 125 | 40 | 500 | 9 | 48.7 |
| 6 | 310 | 125 | 40 | 500 | 9 | 48.7 |
| 17 | 375 | 125 | 40 | 500 | 11 | 48.7 |
| 19 | 375 | 130 | 40 | 500 | 11 | 48.7 |
| 20 | 340 | 120 | 40 | 500 | 11 | 48.7 |

Disc Molding Process B

Alternatively an Arburg 420 C Allrounder 1300-350 injection molding machine, equipped with a Philips CD-Mould and a BD-ROM stamper was used. Following molding parameters were used, see table 5:

TABLE 5

Molding parameters according to disc molding process B used for the different examples

| No. | $T_{Cyl}$ (° C.) | $T_{Mold}$ (° C.) | Clamp Force (kN) | Holding Pressure (bar) | Cooling Time (s) | Injection Speed (cm³/s) |
|---|---|---|---|---|---|---|
| 18 | 290 | 85 | 500 | 580 | 15 | 56.6 |
| 15 | 310 | 130 | 500 | 580 | 15 | 56.6 |
| 6 | 295 | 130 | 500 | 580 | 15 | 56.6 |
| 13 Comp. Example | 290 | 110 | 500 | 580 | 15 | 56.6 |

In table 6 the results of Youngs modulus measurements and the quality factor Q on test beams are depicted. The test beams were produced by direct 1-K molding or by cutting them out of 1-K molded disc substrates.

TABLE 6

Test bars

| | Resin/Compound No. | $T_g$ (°) | Density (g/cm³) | E at 2 kHz (GPa) | Q at 2 kHz |
|---|---|---|---|---|---|
| Example | 7 | 141 | 1.431 | 7.67 | 82.8 |
| Example | 16 | 146 | 1.214 | 2.61 | 141 |
| Example | 3 | 145 | 1.244 | 3.63 | 122 |
| Example | 19 | 160 | 1.204 | 2.71 | 150 |
| Example | 21 | 142 | 1.330 | 3.01 | 146 |
| Example | 22 | 152 | 1.213 | 2.49 | 110 |
| Example | 24 | 147 | 1.167 | 2.33 | 104 |
| Example | 25 | 179 | 1.135 | 2.44 | 72 |
| Example | 26 | 180 | 1.128 | 2.43 | 97 |
| Comp. Example | 23 | 139 | 1.206 | 6.18 | 170 |

All following disc substrate (S) in table 7 and coated disc examples in table 10 are based on a pit structure of the information layer with a track pitch of 320 nm. All discs described in the examples show also very low radial deviation values well within the BD specification of −0.8° to +0.8°.

TABLE 7

1-K molded substrates (S)

| | Resin/Compound No. | Molding Process | Transcriptability (%) | $T_{Mold}$ (° C.) | $T_g$ (° C.) | Rad. Dev. (°) | Density (g/cm$^3$) | E at 2 kHz (GPa) | Q at 2 kHz |
|---|---|---|---|---|---|---|---|---|---|
| Example | 17 | A | 96 | 125 | 143 | +0.290 | 1.132 | 3.26 | 59 |
| Example | 18 | B | 100 | 85 | 93 | −0.539 | 1.194 | 5.10 | 27 |
| Example | 19 | A | 98 | 130 | 160 | +0.730 | 1.177 | 2.61 | 145 |
| Example | 15 | B | 95 | 130 | 144 | +0.146 | 1.250 | 3.68 | 102 |
| Example | 1 | A | 100 | 127 | 142 | +0.280 | 1.214 | 3.15 | 148 |
| Example | 9 | A | 100 | 130 | 146 | +0.320 | 1.193 | 2.88 | 144 |
| Example | 10 | A | 98 | 130 | 146 | +0.360 | 1.202 | 3.33 | 113 |
| Example | 11 | A | 100 | 130 | 144 | +0.300 | 1.224 | 3.94 | 90 |
| Example | 12 | A | 100 | 130 | 144 | −0.500 | 1.248 | 4.94 | 78 |
| Example | 13 | A | 100 | 125 | 143 | +0.320 | 1.248 | 5.08 | 64 |
| Example | 6 | A | 100 | 125 | 138 | −0.200 | 1.329 | 5.97 | 69 |
| Comp. Example | 20 | A | 100 | 120 | 147 | +0.270 | 1.182 | 2.57 | 195 |
| Comp. Example | 13 | B | 84 | 110 | 143 | +1.080 | 1.260 | 5.49 | 65 |

Comparative example 20 does not fulfill the required low Q value despite the fact that transcriptability is high because the difference between glass transition temperature and mold temperature is smaller than 30° C.

Comparative example 13 has a sufficiently low Q value but does not fulfill the transcriptability requirement, because the difference between glass transition temperature and mold temperature is larger than 30° C.

A reflection layer (B) of 50 nm Ag is formed on the substrate (S) by DC sputtering (Reuter LP 800).

The light transmitting layer on top of the reflection layer on the substrate (S) was obtained from the following components and procedures:

Component A.0

Ceria $CeO_2$-ACT®:aqueous suspension of $CeO_2$: 20 wt. % $CeO_2$ nanoparticles in 77 wt. % water and 3 wt. % acetic acid, pH value of the suspension: 3.0, particle size of the suspended $CeO_2$ nanoparticles: 10-20 nm, spec. weight: 1.22 g/ml, viscosity: 10 mPa·s, manufacturer: Nyacol Inc., Ashland, Mass., USA.

Component A.2-1

Binder: dipentaerythritol penta-/hexa-acrylate (DPHA, Aldrich).

Component A.2-2

Binder: hexanediol diacrylate (HDDA, Aldrich).

Component A.2-3:

Binder: Desmolux U 100 (Urethanacrylate, Bayer Materialscience)

Component A.3

UV photoinitiator: Irgacure® 184 (1-hydroxy-cyclohexyl phenyl ketone), Ciba Specialty Chemicals Inc., Basel, Switzerland.

The following components were used as organic solvents in the examples:
1-methoxy-2-propanol (MOP), manufacturer: Aldrich
diacetone alcohol (DAA), manufacturer: Aldrich.

The aqueous $CeO_2$ nanoparticle suspension (component A.0) was converted into a nanoparticle suspension containing water and MOP (component A.1) by means of cross-flow ultrafiltration as described below:

A membrane module from PALL (Centramate OS070C12) with a UF membrane cassette (PES, MW 100,000) was used for the cross-flow ultrafiltration (UF). Permeation took place at a pressure of 2.5 bar, the water-containing permeate being discarded and the decreasing retentate being replaced by the alcoholic solvent 1-methoxy-2-propanol (MOP). 6.5 liters of component A.0 were used. As is shown in the table below, the filtration was ended after three cycles of different lengths, and there were thus obtained nanoparticle suspensions in a mixture of the organic solvent MOP and water (component A.1).

TABLE 8

Composition and properties of component A.1

| Component | Permeation time [h:min] | Amount of permeate [liters] | Water content of the retentate[1] [wt. %] | Solids content [wt. %] |
|---|---|---|---|---|
| A.1 | 15:45 | 13.2 | 12.3 | 30.4 |

[1] determined by means of Karl Fischer titration
[2] contains 3 wt. % acetic acid The casting solution (component A**) having a water content of 10 wt. % was obtained by mixing solution A and solution B:

Solution A: 12.4 g of component A.2-1 and 3.1 g of component A.2-2 and 15.6 g A.2-3 were dissolved, with stirring, in 108 g of the solvent DAA. 2.35 g of component A.3 were then added, whereupon a clear solution forms.

Solution B: In a glass beaker, 54 g of the solvent DAA were added to 435 g of component A.1 and the mixture was stirred, whereupon a transparent, yellow-coloured suspension was obtained, which was treated with ultrasound for 30 seconds. During that 32.5 g of water was added.

Solutions A and B were combined, then treated again with ultrasound for 30 seconds and filtered over a 0.2 μm filter (Minisart RC membrane). The calculated composition of the casting solution (component A*) is as follows:

TABLE 9

Composition and properties of casting solution component A**

| | Constituents in wt. % |
|---|---|
| Component A.2-1 DPHA | 1.86 |
| Component A.2-2 HDDA | 0.47 |
| Component A.2-3 Desmolux U100 | 2.33 |
| Component A.3 | 0.34 |
| $CeO_2$ [1] | 20.00 |
| MOP | 45.00 |
| DAA | 20.00 |

TABLE 9-continued

Composition and properties of casting solution component A**

| | Constituents in wt. % |
|---|---|
| Water | 10.00 |
| Solids content [wt. %] [2] | 25.0 |

[1] The nanoparticle solids fraction (here $CeO_2$) resulting from component A.1
[2] The indicated solids content of each casting solution is the sum of component A.2-1 + component A.2-2 + component A.3 + nanoparticle solids fraction ($CeO_2$).

The real part n of the complex refractive index was measured to be 1.84 at 405 nm and the imaginary part k of the complex refractive index was measured to be 0.004 at 405 nm.

To apply the coating solution (component A*) to the reflective layer (B) on the disc shaped substrate (S) component A* was spin coated by dosing of component A* from a syringe in the inner diameter of the clamped substrate at low rotation speed of 240 RPM over a period of 2.1 seconds, distribution of component A* over the total area of the disc at 750 RPM over a period of 3.5 seconds, conditioning of the distributed component A* at 10 RPM over a period of time of 40 seconds, removal of excess component A* by ramping up the spinning from 10 RPM to 2000 RPM within 20 seconds and keeping constant that high rotation speed for further 14 seconds. The coating was crosslinked with a Mercury lamp at 5.5 J/cm$^2$. The residual layer thickness of the light transmitting layer was 950 nm.

TABLE 10

Coated discs from 1-K molded substrates (S)

| | Resin/ Compound No. | Ra (nm) | Scratch Depth (μm) | Density (g/cm$^3$) | E at 2 kHz (GPa) | Q at 2 kHz |
|---|---|---|---|---|---|---|
| Example | 18 | 2.97 | 0.69 | 1.192 | 5.17 | 27 |
| Example | 15 | 3.78 | 0.48 | 1.290 | 3.57 | 101 |
| Example | 1 | 3.04 | 0.59 | 1.234 | 3.08 | 149 |
| Example | 9 | 2.62 | 0.58 | 1.207 | 2.95 | 150 |
| Example | 10 | 2.94 | 0.65 | 1.218 | 3.35 | 107 |
| Example | 11 | 3.02 | 0.71 | 1.250 | 3.84 | 98 |
| Example | 12 | 3.32 | 0.65 | 1.263 | 5.04 | 79 |
| Example | 13 | 3.17 | 0.71 | 1.264 | 5.22 | 65 |
| Example | 6 | 2.93 | 0.62 | 1.360 | 6.07 | 77 |
| Comp. Example | 20 | 2.97 | 0.62 | 1.198 | 2.55 | 179 |

The invention claimed is:

1. An optical recording medium in which at least a recording layer and a light transmitting layer are sequentially formed on a substrate and in which the light is illuminated from the light transmitting layer side for recording and/or reproducing information signals, said substrate comprising an injection molded part and said substrate having a Young's modulus E of at least 2.15 GPa and a Q factor of lower than 160 measured at 25° C. at 2000 Hz in accordance to ASTM E 756-05 and a transcriptability>85%.

2. An optical recording medium according to claim 1, wherein the substrate is molded at a mold temperature>Tg (glass transition temperature)-30° C.

3. An optical recording medium according to claim 2, wherein the mold temperature>Tg (glass transition temperature)-20° C.

4. The optical recording medium according to claim 1, wherein said substrate has a Young's modulus E of at least 2.93 GPa and a Q factor of lower 160 measured at 25° C. at 2000 Hz in accordance to ASTM E 756-05.

5. The optical recording medium according to claim 1, wherein said substrate is polycarbonate containing fillers.

6. The optical recording medium according to claim 5, wherein said filler, measured on a bulk sample, has a hardness, in accordance to the Mohs scale of less or equal to 5.

7. The optical recording medium according to claim 6, wherein said filler is based on primary nano particles with a $d_{50}$ of less than 100 nm.

8. The optical recording medium according to claim 1, wherein said substrate having pits aligned along a spiral track and or spiral grooves with a track pitch of less than 350 nm.

9. The optical recording medium according to claim 1, wherein said light transmitting layer is a UV curable and spin-coatable resin with a real part n of the index of refraction of at least 1.41.

10. The optical recording medium according to claim 1, wherein said light transmitting layer is a UV curable and spin-coatable resin having (i) a complex refractive index in which the real component n is at least 1.70 and in which the imaginary component k is at most 0.016, (ii) a surface roughness $R_a$ of less than 20 nm and (iii) a scratch resistance of not greater than 0.75 um scratch depth, said real component n and imaginary component k measured at a wavelength of 400 to 410 nm, and said surface roughness $R_a$ determined by Atomic Force Microscopy, and said scratch depth determined by moving a diamond needle having a tip radius of 50 um over the coating on a polycarbonate substrate at a rate of advance of 1.5 cm/s under an applied weight of 40 g.

11. The optical recording medium according to claim 1, wherein said light transmitting layer is a UV curable and spin-coatable resin comprising nanoparticles with an average particle size ($d_{50}$) of less than 100 nm.

12. An optical recording medium according to claim 1, wherein the thickness of the light transmitting layer is from 1 nm to less than 3000 nm.

13. An optical recording medium according to claim 1, wherein the thickness of the light transmitting layer is from 500 nm to less than 1500 nm.

14. The optical recording medium according to claim 1, wherein the substrate comprises a polycarbonate resin in which the aromatic dihydroxymonomer is derived from aromatic dihydroxy compounds of formula (1)

$$HO-Z-OH \quad (1)$$

in which Z denotes a radical of the formula (1a)

in which
R$^1$ and R$^2$ independently of each other represent H or C$_1$-C$_8$-alkyl and X represents a single bond, C$_1$-C$_6$-alkylene, C$_2$-C$_5$-alkylidene or C$_5$-C$_6$-cycloalkylidene, which may be substituted by C$_1$-C$_6$-alkyl,
with the proviso that R$^1$ and R$^2$ represent hydrogen if X represents 3,3,5 trimethylcyclohexylidene.

15. A method of preparing the substrate as basis for the optical recording medium according to claim 1 wherein the substrate is molded at a mold temperature>Tg (glass transition temperature)-30° C. against a stamper including pits and/or grooves by which method said pits and/or grooves are replicated into the substrate with a transcriptability>85%.

* * * * *

UNITED STATES PATENT AND TRADEMARK OFFICE
CERTIFICATE OF CORRECTION

PATENT NO.        : 8,709,571 B2                                                                    Page 1 of 1
APPLICATION NO. : 13/142106
DATED             : April 29, 2014
INVENTOR(S)       : Bruder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 354 days.

Signed and Sealed this
Twenty-ninth Day of September, 2015

Michelle K. Lee
*Director of the United States Patent and Trademark Office*